April 5, 1932.  L. C. MILBURN  1,852,622
AIRPLANE WING STRUCTURE
Filed June 9, 1927  2 Sheets-Sheet 1

INVENTOR
Lessiter C. Milburn
BY
Kwis Hudson & Kent
ATTORNEY

April 5, 1932.                L. C. MILBURN                1,852,622
                          AIRPLANE WING STRUCTURE
                      Filed June 9, 1927         2 Sheets-Sheet 2

INVENTOR
Lessiter C. Milburn
BY
Kwis Hudson & Kent
ATTORNEY

Patented Apr. 5, 1932

1,852,622

UNITED STATES PATENT OFFICE

LESSITER C. MILBURN, OF CLEVELAND, OHIO, ASSIGNOR TO THE GLENN L. MARTIN COMPANY, OF CLEVELAND, OHIO, A CORPORATION OF OHIO

AIRPLANE WING STRUCTURE

Application filed June 9, 1927. Serial No. 197,532.

This invention relates to improvements in airplanes, more particularly airplanes employing metal structural members.

Where metal structural members have been used in airplane framing a light weight material known as duralumin has been employed to a considerable extent. This material has important advantages, but it is open to the objection that it deteriorates readily under atmospheric and moisture conditions and, consequently, should be periodically inspected for defective spots and such spots painted or otherwise treated. Inspection and treatment of open columns or built up beams is readily accomplished, but the inspection and treatment of the interior surfaces of closed or substantially closed sections has heretofore been impossible, and, consequently, failures have occurred in parts which, to all external appearances, were in perfect condition.

One of the objects of my invention, therefore, is to provide for the inspection and treatment of internal surfaces of built up metal columns or beams, and to compensate for local weakening due to removal of web metal when forming inspection holes.

Another object of the invention is to provide an improved truss construction for airplane ribs whereby the crippling lengths of the heavily stressed chord, and web members may be reduced for inverted as well as for ordinary flight.

A further object is the provision of means for eliminating gusset plates in built up beam constructions, thereby reducing the weight of the beam and the number of rivets which must be placed.

Another object of the invention is the provision of an improved built up structure for a drag strut, that is a wing reinforcement running parallel to the wing ribs.

Other objects and objects relating to details of construction and economies of manufacture, will appear as I proceed with the description of those embodiments of the invention which, for the purposes of the present application, I have illustrated in the accompanying drawings in which.

Similar reference characters refer to like parts throughout the views.

Figure 1:
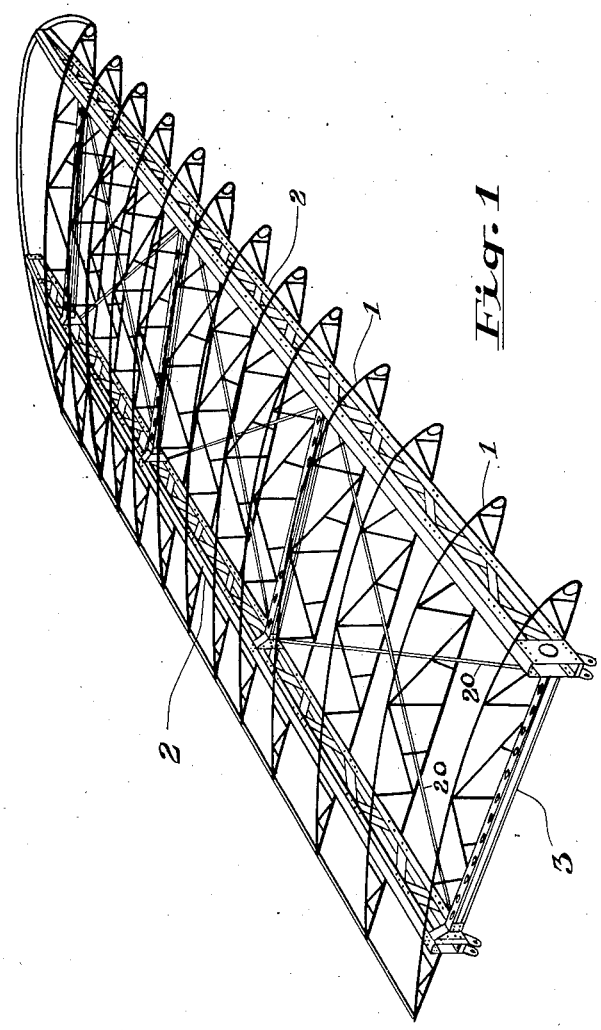
Fig. 1 is a perspective view of an airplane wing panel in skeleton form.
Figure 2:
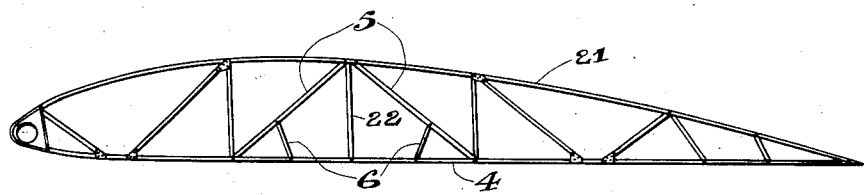
Fig. 2 is a side elevation of one of the wing ribs.

In the drawings, the numeral 1 is applied generally to a wing rib formed preferably of metal parts. These ribs are mounted upon and secured in any suitable manner to a frame work made up of front and rear wing beams 2, drag struts 3 and diagonal brace rods 20.

Each of the ribs 1 has a lower chord 4 and an upper chord 21. Intermediate of the ends of the rib in a position where the greatest stresses occur, is a vertical strut 22 joining chords 4 and 21, and this vertical strut constitutes the central member of a truss, the side members or upper chord of which are shown at 5 while the lower chord is the chord 4 of the rib. I add short struts 6 inclined at about the same angle to both of the chords 4 and 5 and disposed somewhere near halfway between the strut 22 and the points of connection between the chords 4 and 5. When the plane is in normal flight, the struts 6 stabilize the compression chord 4 by their attachment to tension diagonals 5. When the plane is in inverted flight and the diagrams 5 become compression members, the struts 6 then stabilize diagonals 5 by their attachment to the tension chord 4.

Figure 3:
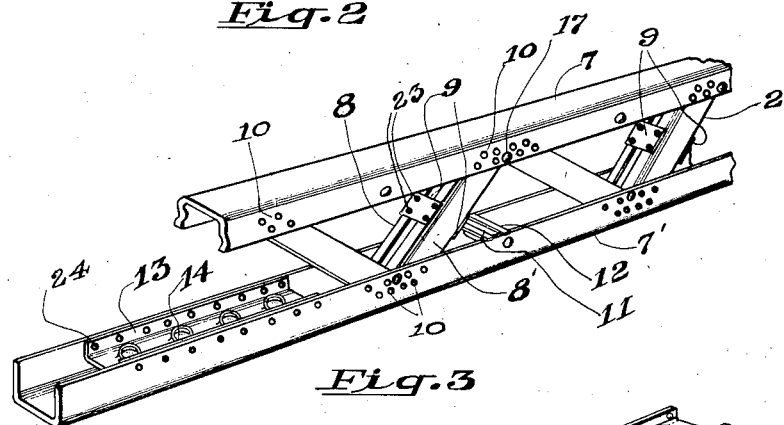
Fig. 3 is a perspective view of a fragment of a wing beam.

Referring now to Fig. 3, wherein is shown a portion of one of the wing beams 2, 7 and 7' are channel chord members the flanges of which on either side are joined by diagonal members 8 and 8', also channel-shaped. The flanges of the diagonal members are connected together in pairs by means of plates 9 which are secured by rivets 23 in multiple to each flange.

The diagonal members 8 and 8′ are connected directly to the flanges of the channels 7 and 7′ by rivets 10, thereby dispensing with the usual gusset plates which must be secured first to the channel flange and then to the web members, thus adding materially to the weight of the beam and to the amount of labor involved in assembling the beam without increasing the strength of the latter. In order to prevent buckling of the flanges of the channels, the flanges being of considerable width in order to accommodate a sufficient number of rivets, I employ at intervals spacer rivets 11 with reinforcing spacers 12 which are quadruple flanged channels with lips 12′ for extending over the edges of the channel chords to prevent their displacement. I also employ spacer rivets 11 in the angles between adjacent web members 8 and 8′. I also reinforce the channels between diagonal members by somewhat lighter weight channel plates 13 secured in place as by rivets 24. Inspection holes are formed in these plates, and their edges are preferably flanged as shown at 14, to increase their stiffness.

Figure 4:
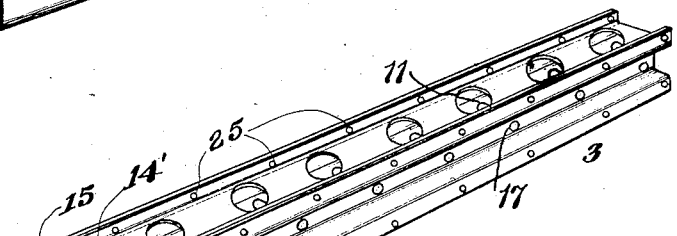
Fig. 4 is a perspective view of a wing drag strut.

In Fig. 4 I have illustrated, more or less in detail, a hollow beam possessing remarkable rigidity and which I employ as a drag strut for a wing panel, but which is capable of other uses in airplanes. It consists of a pair of quadruple flanged channels 16 arranged back to back and separated by spacer rivets 11, headed over at end portion 17, that are employed to hold the flanged channels in fixed relation to each other. The upper and lower members 15 and 15′ of the beam are formed of somewhat lighter gauge material than the quadruple flanged channels 16 and have flanged edges which are riveted to the flanges of the quadruple flanged channels, as shown at 25. At regular intervals the members 15 and 15′ may be provided with holes 14′ having a diameter such as to permit inspection and to facilitate the application of anti-corrosion material to the interior surfaces whereby the life of aluminum alloy structures can be considerably extended and the danger from accidents caused by failure of metal parts is materially decreased.

The spacer rivets 11 which are located at right angular intersecting relation to the axis of inspection holes 15′ compensate for the metal that was removed when forming the holes and which would otherwise have acted as a local tie between the flanges of the dual flanged members. The beam as set forth possesses a materially higher strength-weight ratio and a lower sectional area-rigidity ratio than were heretofore attained in composite members for aircraft structures.

Figure 5:
Fig. 5 is a sectional detail showing a spacer construction employed in carrying out my invention.
Figure 6:
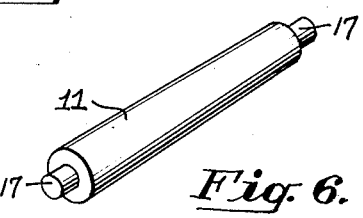
Fig. 6 is a perspective view of one of the spacer rivets indicated in Figs. 3, 4, and 5.

Spacer rivet 11 may comprise a tubular portion and a rod portion 17 for assembly under the conditions shown in Figs. 3 and 5, or one piece spacer rivets 11 can be used under the conditions shown in Fig. 4.

Having thus described my invention, I claim:

1. In a wing rib for airplanes, a truss structure of high strength-weight ratio comprising a base member, a vertical strut and a diagonal member forming substantially a right-angled triangle, a short strut diagonally connecting an intermediate point on the diagonal with an intermediate point on the base member, and an upper chord member supported by said truss structure at the top of said triangle.

2. In a wing rib for airplanes, a truss structure of high strength-weight ratio comprising a lower chord and a pair of inclined members, a strut substantially perpendicular to said lower chord connecting the lower chord with the point of juncture between the inclined members, and a pair of short struts diagonally connecting intermediate points of the inclined members with points of the lower chord spaced from said first named strut.

3. In a wing rib for airplanes, a truss structure of high strength-weight ratio comprising a vertical strut at substantially the position of greatest stress in the rib, a pair of inclined members extending downwardly at reversed angles from the upper end of said strut, a lower chord member extending laterally both ways from the lower end of said strut to a point of juncture with said inclined chord members, and a pair of auxiliary struts diagonally connecting at angles other than right angles two intermediate points on said inclined side members with two points on said lower chord member spaced from said vertical strut.

4. In a wing rib for airplanes, an upper chord member and a lower chord member, a perpendicular strut joining said chord members, an inclined member extending from the upper end of said strut to said lower chord member, and a short diagonal strut connecting an intermediate point on said inclined member with a point on the lower chord member intermediate the lower ends of said strut and inclined member.

5. In a wing rib for airplanes, a truss structure comprising a base member; a vertical strut and a diagonal member forming substantially a right angled triangle; a short strut connecting an intermediate point on the diagonal member with an intermediate point on the base member, said short strut forming an included angle substantially less than 90° in relation to said base member and to said diagonal member; and an upper chord member supported by said truss structure at the top of said triangle.

6. In a wing rib for airplanes, a truss structure of high strength-weight ratio and comprising a base member; vertical struts; diagonal tie members forming substantially right angle triangles in relation to said vertical struts; short struts connecting intermediate points on said ties to intermediate points on said base members thereby forming included angles of less than 90°; and an upper chord member supported by said truss structure at the top of said triangles.

7. In an airplane, a built up drag strut of high strength to weight ratio and low cross sectional area to rigidity ratio comprising a pair of quadruple flanged channel members arranged back to back and spaced apart; riveted spacers for attaching said quadruple flanged channel members at their webs in said spaced apart relation; a pair of flat webbed dual flanged channel members arranged back to back with their flanges between and fastened to the remote flanges of said quadruple flanged channel members.

8. In a metal beam construction for airplanes, an upper chord member and a lower chord member each having two side flanges; oppositely disposed diagonal members in laterally paired relation each having two side flanges; said diagonals bridging the space between said chord members, and each end portion of said diagonal abutting and riveted to a flange of said chords; and the middle portions of said paired diagonal member flanges joined by an overlying plate riveted in multiple to each flange.

9. In an airplane, a built up drag strut comprising a pair of quadruple flanged members arranged back to back and spaced apart; a pair of dual flanged members arranged back to back and spaced apart with their flanges between and fastened to the outer flanges of said quadruple flanged members; said dual flanged members provided with holes in their webs of a size to facilitate anti-corrosion treatment of the interior surfaces of said members; a spacer rivet arranged at a right angular intersecting relation to the axis of the adjacent hole and fastened to the web of each quadruple flanged member.

10. In an airplane, a built up drag strut of high strength to weight and low cross sectional area to rigidity ratios comprising a pair of channel members arranged web to web and spaced apart, each of said members comprising two longitudinally flanged edge portions edge joined by a flat web portion paralleling said flanges; riveted spacers connecting said webs in said spaced relation; a pair of longitudinally flanged flat webbed members arranged web to web and spaced apart with their flanges between and joined to the outer flanges of said channel members, said webs having holes of a size to facilitate anti-corrosion treatment of the interior surfaces of said members, and the plane of said holes lying parallel to said spacers.

11. In an airplane, a built up drag strut of high strength to weight and low cross sectional area to rigidity ratios comprising a pair of channel members arranged web to web and spaced apart, each of said members comprising two longitudinally flanged edge portions edge joined by a flat web portion paralleling said flanges; riveted spacers connecting said webs in said spaced relation; a pair of longitudinally flanged flat webbed members arranged web to web and spaced apart with their flanges between and joined to the outer flanges of said channel members, said webs having holes of a size to facilitate anti-corrosion treatment of the interior surfaces of said members, and said spacer rivets arranged at a right angular intersecting relation to the axis of the adjacent hole.

12. A structural beam comprising in combination a dual flanged member laterally reinforced by a quadruple flanged spacer comprising side flanges, remote flanges and a web, said remote flanges projecting longitudinally beyond the ends of said side flanges and said web; the ends of said web and said side flanges of said spacer located between and in end-to-side contact with the flanges of said dual flanged member, and the projecting portion of said spacer overlying the flanges of said dual flanged member in side-to-edge relation; a spacer rivet longitudinally located between said side flanges of said spacer and laterally located in retaining relation to said dual flanges and to said spacer.

In testimony whereof, I hereunto affix my signature.

LESSITER C. MILBURN.